Patented May 28, 1929.

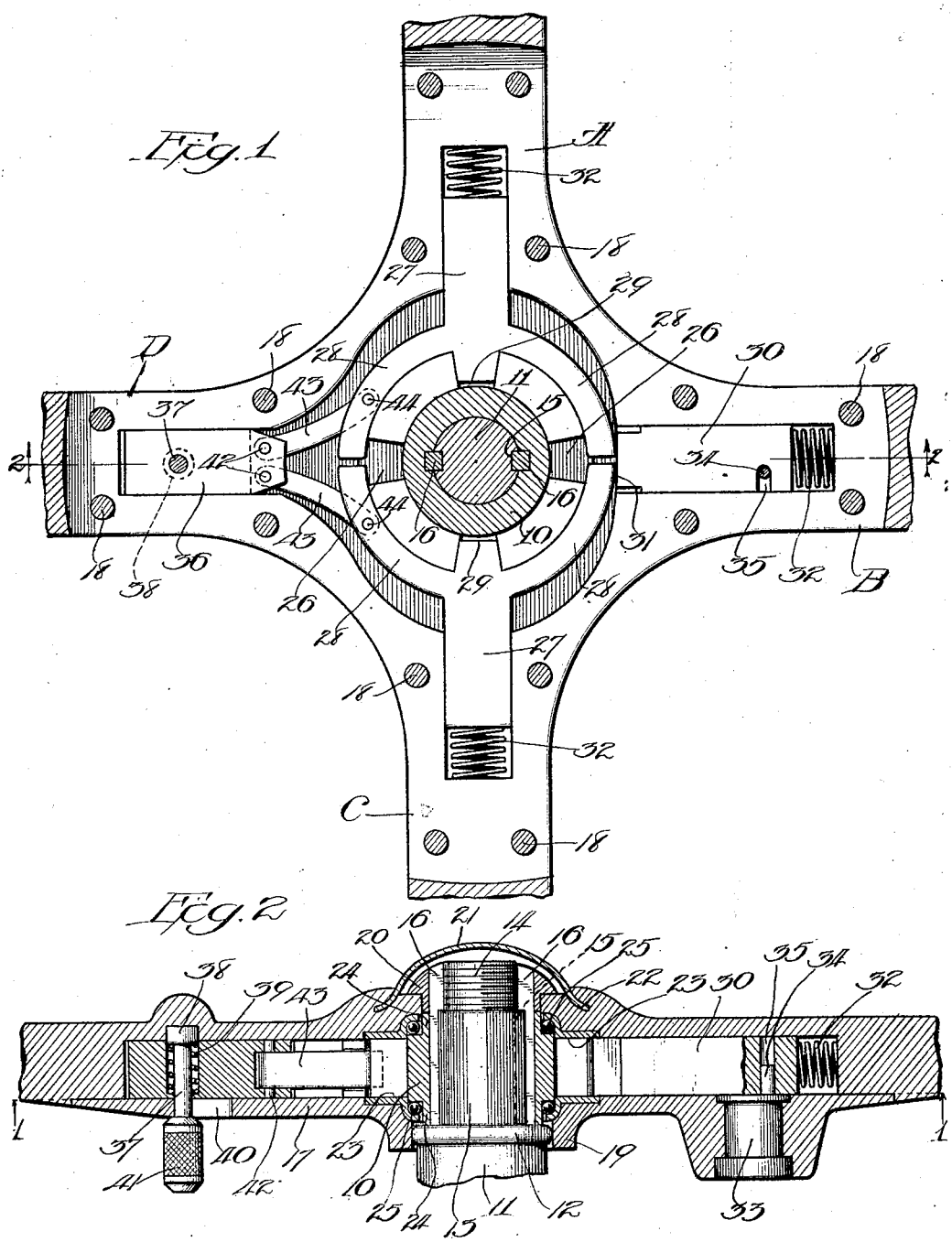

1,714,914

UNITED STATES PATENT OFFICE.

LEROY C. LAZEAR, OF CHICAGO, ILLINOIS, ASSIGNOR TO THE DILL MANUFACTURING COMPANY, OF CLEVELAND, OHIO, A CORPORATION OF OHIO.

STEERING WHEEL.

Application filed May 1, 1919, Serial No. 293,980. Renewed July 6, 1922. Serial No. 573,189.

This invention has to do with steering wheels for automobiles, motor boats, etc., and is specially concerned with means for interlocking the wheel to the post having connection with the steering apparatus, and with means by which this interlocking connection may be disestablished to render the steering wheel inoperative; more particularly, the present wheel is adapted to Ford cars, although its use need not be restricted to such application.

Various forms of steering wheel locks for automobiles and the like have heretofore been devised, usually involving the attachment of certain unsightly parts to the steering wheel or to the post upon which it is mounted. Such steering wheel locks, furthermore, are ordinarily complicated, and not uniformly effectual, so that they perform inadequately their intended functions. In addition to these disadvantages, it is usually not difficult for an unauthorized person to pick or tamper with the locks so provided, in consequence of which no real protection is afforded.

My improved steering wheel provides a connection with the post which is entirely concealed so that the wheel remains substantially the same in appearance as others commonly in use; it includes means, however, by which the wheel may be readily rendered operative or inoperative as desired. It is, furthermore, simple and positive in its action, and retains within its own body practically all the operative elements necessary to effect the desired locking and unlocking actions. For these as well as other reasons, it is practically immune from tampering. These and other objects of my invention will more fully hereinafter appear from the specification and claims, and from the accompanying drawing in which—

Figure 1 is a view looking toward the under side of the central portion of a steering wheel constructed in accordance with my invention, the spider plate being removed to better exhibit the interior parts; and Fig. 2 is a cross section therethrough, taken on line 2—2 of Fig. 1.

Inasmuch as the parts special to this invention are all located in the central portion of the wheel, I have thought it sufficient to illustrate only this portion. Accordingly there is shown the inner ends of the wheel spokes which may conveniently be four in number designated as A, B, C, and D. It will be understood that these spokes extend outwardly from the center as far as desired to support a circular rim. The wheel is adapted for operative connection with a hub 10 that is attachable to the upper end of a steering post 11, which, in the form shown in Fig. 2, follows the construction that is used with automobiles of the Ford make. On such a post an annular shoulder 12 is provided above which is a neck 13 which terminates in a threaded head 14 of a reduced diameter, slots 15 being cut into the head and neck as shown. The hub 10 which is arranged to fit upon a post so formed is provided with one or more slots complementary to the slots 15, so that keys 16 may be received therein to lock the hub non-rotatably to the post.

It will be noted that the several spokes of the wheel are merged into a central portion which is hollowed to provide a space for the reception of the hub and the various locking elements that will presently be described. This space, in the construction shown, opens onto the under side of the wheel to facilitate its manufacture and assembly; but in completed condition is closed by means of a spider plate 17 suitably secured in place with rivets 18 or other appropriate devices. Adjacent to the hub the spider plate is formed with a flange 19 which preferably depends below the shoulder 12 in protecting relation thereto. The upper side of the wheel adjacent its center is formed to overlie the hub and to occupy an outer and underlying relation to a cap 20 that is threaded upon the post head. Within this cap are slots corresponding to the slots 15, permitting the keys 16 when driven to position to lock the cap against removal from the post. Overlying the cap is a shield 21 curved to resist engagement by a wrench or other instrument, and having its circular edge 22 lodged within a suitable slot for this purpose that is formed on the upper side of the wheel. The shield may be sprung into place and when positioned as described constitutes a barrier against insertion of a prying instrument beneath the cap.

Interposed between the wheel and hub are two ball raceways, preferably made of hardened steel, each in the form of a ring designated as 23 arranged adjacent the upper and lower ends respectively of the hub. It will be noted that each end of the hub is formed with an extension collar 24 to provide an annular course within which may be received anti-friction devices, such as balls 25 adapted to co-operate with the rings 23 which are seated immovably within recesses suitably formed in the wheel and spider plate. This construction provides a connection developing a minimum of friction between the wheel and hub, and prevents binding therebetween regardless of the manner in which pressure may be applied. This feature is of importance since it is a common fault in steering wheels which are arranged to unlock from the post that if a sufficient pressure be applied to one side of the wheel a binding action results such as to afford to an unauthorized person a working control of the steering apparatus.

The means for locking the wheel to the post include notches or recesses 26 formed on the body of the hub which lies in a plane coincident with the chamber interiorly of the wheel, each notch, by preference, being slightly tapered in the direction of the wheel center. Other means co-operating with these notches are movably arranged within the wheel chamber, and in the form shown, consist of two similar clutch plates 27, one arranged within each of two opposite spokes, such as A and C. Each clutch plate is formed with a pair of bow-shaped arms 28 having a curvature corresponding closely to that of the hub, a tapered head 29 being projected centrally between the arms in position to enter one of the notches 26, as shown in Fig. 1. With this arrangement of the parts, the extremities of the bow-arms lie in proximate relation to the vicinity of the spokes B and D.

Within the spoke B I have arranged a slidable bolt 30 whose retractive movements are governed by a key-controlled lock which will be presently described. The acting end of this bolt, designated as 31, tends to enter between the proximate ends of the bow arms 28 under the influence of a coiled spring 32 which lies in abutting relation to its rear end, whenever the clutch plates are separated sufficiently for this purpose. Means operable by a suitable key are provided for retracting the bolt 30 from its advanced position between the bow-arms so that the clutch plates may slide forwardly into locking relation with the hub. As a simple assembly of parts for this purpose I have shown in Fig. 2 a rotatable cylindrical lock 33 having the usual slit for the entry of a proper key, this lock being suitably positioned within the spider plate as shown. A connection between this lock and the bolt 30 is provided by means of a pin 34 located eccentrically of the axis of the lock, and disposed within a slot 35 formed transversely in the bolt 30, the arrangement being such that when the lock is rotated under the influence of the proper key, it will cause the bolt 30 to be retracted from its advanced position.

Within the spoke D means are provided for manually withdrawing the clutch plates 27 from engagement with the hub so as to render the wheel inoperative in its relation to the steering post. Such means include a slidable plate 36 equipped with a locking pin 37 (see Fig. 2) having a head 38 normally projected under the influence of a spring 39 into a socket formed within the upper side of the wheel, the pin extending downwardly through a slot 40 formed in the spider plate and terminating in a handle 41 as shown. By this means it will be noted that the plate 36 when positioned as shown in Fig. 1 is locked against accidental movement.

Pivoted to the forward end of the plate 36 as at 42 are two links 43 each of which maintains a pivotal connection as at 44 with the proximate bow arms 28 formed on the respective clutch plates 27. When these clutch plates are in engaging relation with the hub, the two links 43 assume divergent positions, and, with the plate 36, constitute in effect a toggle such that movement of the plate 36 toward the center of the wheel will produce a separation of the two clutch plates sufficiently distant to disengage them from the hub; and this movement will result in the bolt 30 under the influence of the spring 33, entering into position between the ends of the bow arms proximate to the spoke B, thus positively preventing the clutch plates from engaging with the hub. The means just described are employed for retracting the clutch plates whenever it is desired to render the steering wheel inoperative relative to the post. As already explained, however, the return movements of the clutch plates may be accomplished merely by retracting the bolt 30 with the aid of a proper key entered into the cylindrical lock 33.

The structure of the present steering wheel is such as to make it difficult, if not impossible, to tamper or pick the locking elements. It is only by laborious effort that the spider plate may be removed, due to the permanent character of the fastenings employed. While the obstacles in the way of removing the wheel from the post are almost insurmountable, the operation of initially installing the wheel is very simple, which requires merely that the wheel and hub be positioned upon the post, the cap applied in place, and the keys driven to position to lock these parts in non-rotatable relation. When the shield is thereafter fitted over the cap, these various parts are effectively protected. The locking parts interiorly of the wheel are also protected by the hard steel ball rings 23 which will resist any attempt at drilling preliminary to insertion of a pin by which to temporarily lock the wheel to the hub.

I claim:

1. In combination with a steering post having a shoulder thereon, a hub adapted for locking attachment to the post adjacent its shoulder, a wheel surrounding the hub having a central chamber into which the hub extends an anti-friction connection between the wheel and hub consisting of an annular race-way on the hub, ball bearings therein, and a ring adapted to co-operate therewith, the wheel being formed to provide a seat within which the ring is accommodated, and means for rotatively locking and unlocking the wheel relative to the hub, substantially as described.

2. In combination with a steering post, a hub adapted for locking attachment thereto, a wheel in operative relation to the hub having means for locking therewith consisting of plates carried by the wheel and movable radially toward and from the hub which is notched to receive the plate ends, and a toggle connection between the plates by which they may be moved together into and out of locking position, substantially as described.

3. In combination with a steering post, a hub adapted for locking attachment thereto, and a wheel in operative relation to the hub having means for locking therewith consisting of two plates movable radially of the wheel and each adapted to enter notches formed within the hub, a link secured to each plate, and a member to which both links are secured, the member, links, and plate constituting a toggle connection, whereby the plates are moved radially in unison toward and from the hub with actuation of the member, substantially as described.

4. In combination with a steering post having a hub, a chambered wheel adapted for mounting on the post in a manner to receive the hub within its chamber, means within the wheel chamber adapted to interlock with the hub, closure means for the wheel chamber having a removable connection with the wheel, and a protecting device for the closure means comprising a shield having its edges sprung to lie within a slot formed upon the wheel whereby the shield is secured to the wheel, substantially as described.

5. In combination with a steering post having a hub, a chambered wheel adapted for mounting on the post in a manner to receive the hub within its chamber, means within the wheel chamber adapted to interlock with the hub, closure means for the wheel chamber having a removable connection with the wheel, and a protecting device for the closure means in overlying relation thereto having peripheral edges lodged within a slot formed upon the adjacent wheel side, substantially as described.

6. In combination with a steering post having a hub, a chambered wheel adapted for mounting on the post in a manner to receive the hub within its chamber, means within the wheel chamber adapted to interlock with the hub, closure means for the wheel chamber having a removable connection with the wheel, and a spring shield overlying the closure means having its peripheral edges sprung into interlocking relation with the wheel, the shield sides having a curvature such as to resist engagement from its opposite sides, substantially as described.

7. In combination with a steering post, a hub adapted for locking attachment thereto, and a wheel in operative relation to the hub having means for locking therewith consisting of a plate carried by the wheel having capacity for movement towards and from the hub wherein is a notch adapted to receive a plate part, a member having capacity for movement in a direction angular to that of the locking plate, and a link connection extending only between the member and the locking plate part adapted to transmit movements from the former to the latter, substantially as described.

8. In combination with a steering post having a hub, a chambered wheel adapted for mounting on the post in a manner to receive the hub within its chamber, means within the wheel chamber adapted to interlock with the hub, closure means for the wheel chamber having a removable connection with the post, and a protective device for the closure means adapted to interlock with the wheel for preventing access to the top of the steering post.

9. In combination with a steering post having a shoulder thereon, a hub adapted for locking engagement with the post adjacent its shoulder, a wheel surrounding the hub having a central chamber within which the hub is enclosed, an anti-friction connection between the wheel and hub comprising an annular raceway on the hub, ball bearings therein, and a ring adapted to cooperate therewith, the wheel having a seat formed therein for receiving the ring, means for locking and unlocking the wheel relative to the hub, and a protective member in interlocking relation with the wheel for preventing access to the steering post.

LEROY C. LAZEAR.